United States Patent Office 2,861,843
Patented Nov. 25, 1958

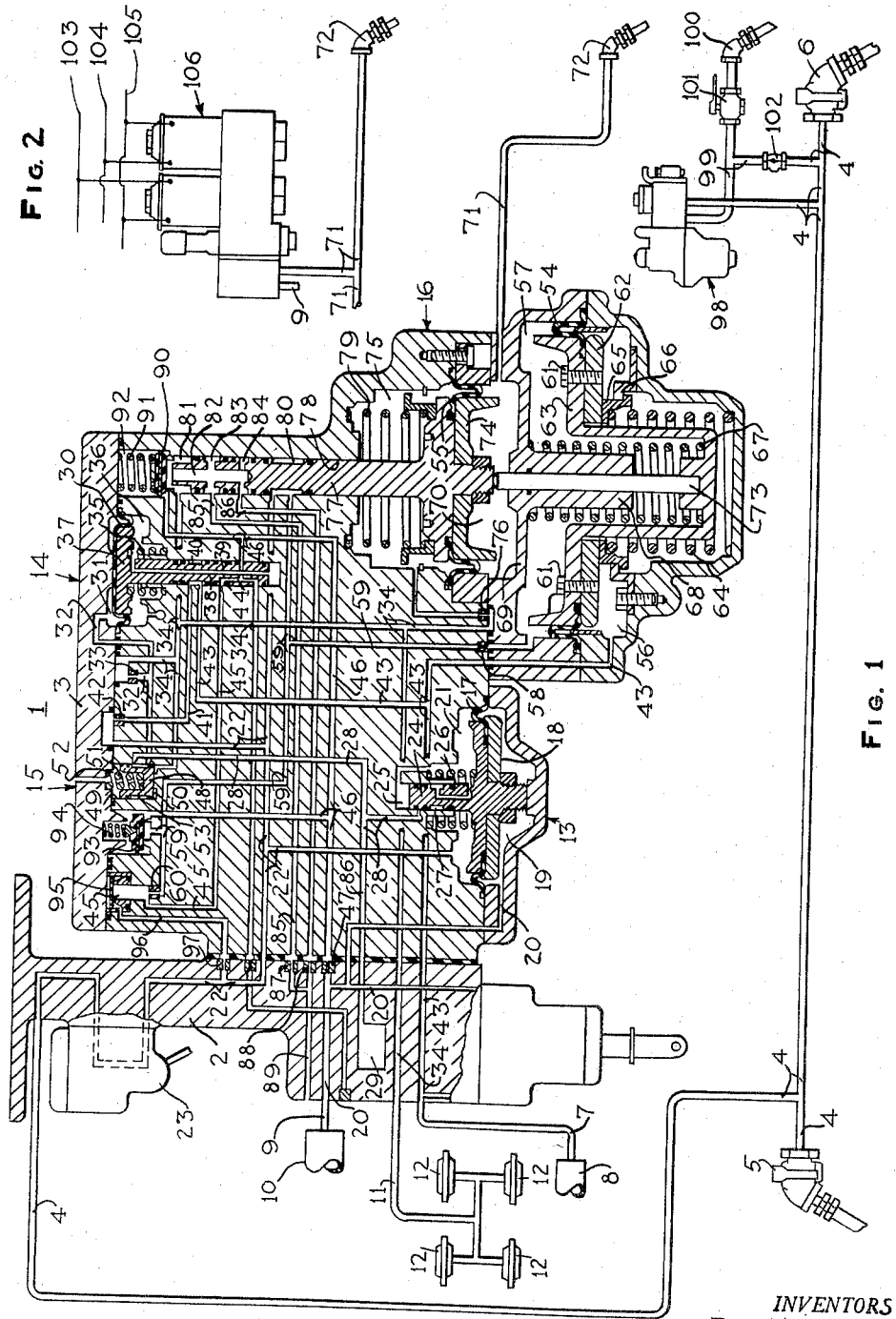

2,861,843

COMBINED AUTOMATIC AND STRAIGHT-AIR FLUID PRESSURE BRAKE EQUIPMENT

Ronald J. Bentz, Pittsburgh, and William B. Jeffrey, Irwin, Pa., assignors to Westinghouse Air Brake Company, Wilmerding, Pa., a corporation of Pennsylvania Application May 23, 1955, Serial No. 510,174

6 Claims. (Cl. 303—26)

This invention relates to fluid pressure brake equipment and more particularly to an improved combined automatic and straight-air fluid pressure type especially adapted to control brakes on a road-rail vehicle or on a railway car selectively on the automatic brake pipe reduction principle and the straight-air principle.

In order to increase the speed and efficiency with which freight can be transported, it has been proposed to provide a road-rail vehicle which can not only be coupled with other similar vehicles or with conventional railway cars and hauled as a car in a railway train, but which can also be hauled on highways as an individual trailer unit drawn by a corresponding automotive tractor. Since the brakes on railway cars are generally controlled on the automatic brake pipe reduction principle, whereas the brakes on automotive tractor-drawn trailers are generally controlled on the straight-air principle, it is desirable to provide on each road-rail vehicle a unitary fluid pressure brake equipment which is capable of controlling brakes by responding, selectively, to variations in pressure of fluid in a brake pipe as controlled from a railway locomotive and also to variations in pressure in a service or straight-air pipe as controlled from an automotive tractor or the usual magnet valve device of an electro-pneumatic railway brake equipment.

The principal object of this invention is to provide a relatively inexpensive and compact unitary fluid pressure brake equipment of the type and for the purpose just described.

Another object is to provide an improved brake equipment generally of the automatic graduated release type, modified and arranged to respond to variations in straight-air pipe pressure as controlled from either an automotive tractor or a railway locomotive.

Another object is to provide a brake equipment of the above type in which pull-apart or loss of supply reservoir pressure on the automotive tractor will cause an automatic application of brakes on the road-rail vehicle.

Another object is to provide a simplified, relatively inexpensive electro-pneumatic brake equipment for use on a railway car.

Other objects and advantages will become apparent from the following more detailed description and from the accompanying drawing, wherein Fig. 1 is a diagrammatic view of a brake equipment embodying the invention, and Fig. 2 is a fragmentary view, in outline, of a modified portion of the brake equipment shown in Fig. 1.

*Description—Fig. 1*

As shown in Fig. 1 of the drawing, the improved brake equipment for each road-rail vehicle comprises a brake controlling valve device 1 which, in turn, comprises a pipe bracket 2 to which is suitably mounted a sectionalized casing 3.

To the pipe bracket 2 is suitably connected a branch of a brake pipe 4, which pipe extends the length of the vehicle and is adapted at its respective ends for connection to the brake pipe on adjacent forward and rearward vehicles (not shown) of a train by way of conventional angle cocks 5, 6, respectively; said cocks being manually operable to an open position so that when the vehicle is hauled in a train, brakes on the particular vehicle may be controlled, in the well-known manner, according to variations in pressure of fluid in the brake pipe as effected by manual operation of the usual engineer's automatic brake valve device (not shown) provided on the locomotive. To the pipe bracket 2 are also connected a pipe 7 leading to a control reservoir 8; a pipe 9 leading to an auxiliary reservoir 10; and a branched pipe 11 leading to individual automotive-type brake cylinders 12, each of which may be associated with a respective wheel of the vehicle.

Formed within and in part defined by the various sections of the casing 3 are a quick service valve device 13, a charging valve device 14, an interlock valve device 15, and an improved service valve device 16.

The quick service valve device 13 may, for sake of illustration, comprise an annular flexible diaphragm 17 suitably clamped adjacent its outer peripheral edge between sections of the casing 3 and adjacent its inner edge between portions of a diaphragm follower assemblage 18. The diaphragm 17 is subject at one side to pressure of fluid in a chamber 19 which is constantly open to the auxiliary reservoir 10 via a passage 20 and the pipe 9; and said diaphragm is subject at the opposite side to pressure of fluid in a chamber 21 that is constantly open to the brake pipe 4 via a passage 22 and the usual brake pipe cut-out cock 23. Preferably formed integrally with one of the portions of the diaphragm follower assemblage 18 is a coaxially arranged, cylindrical slide valve 24 which extends through the chamber 21 and has sealing, slidably guided engagement with the wall of an aligned bore in the casing. So that the opposing fluid pressures acting on the diaphragm 17 will be effective on equal areas thereof, a chamber 25 defined in part by the base and surrounding wall of the last mentioned bore is constantly open to the chamber 21 via a suitable passageway.

When the pressures of fluid in the chambers 19, 21 are substantially equal, a helical bias spring 26 disposed in chamber 21 and acting on the assemblage 18 urges the slide valve 24 to a normal position, in which it is shown in the drawing, and in which an elongated annular cavity 27 formed in said slide valve and constantly open to the chamber 21 is out of registry with a passage 28 that leads to a quick service volume 29.

The changing valve device 14 may, for sake of illustration, comprise a flexible diaphragm 30 that is suitably clamped about its outer peripheral edge between sections of the casing. The diaphragm 30 is subject at one side to pressure of fluid in a chamber 31 that is constantly open to the brake cylinder pipe 11 via a passage 32, a combination continued quick service reduction and charging valve blow-down control choke 33, and a brake cylinder passage 34. The diaphragm 30 is subject at the opposite side to pressure of a helical bias spring 35 that is disposed in an atmospheric chamber 36 and acts on said diaphragm through the medium of a diaphragm follower 37; said follower preferably being formed integrally with a coaxially arranged slide valve 38 that extends through the chamber 36 and has sealing slidably guided engagement with the wall of an aligned bore 39 in the casing.

When the chamber 31 is devoid of fluid under pressure, the slide valve 38 will assume a charging position, in which it is shown in the drawing, under action of spring 35. In this position, an elongated annular cavity 40 formed in the slide valve 38 connects a passage 41, that is constantly open to the brake pipe passage 22 via a control reservoir combined charging and overcharge dissipation choke 42, with a passage 43 that leads to the control reservoir pipe 7; and also in this position, a port 44 formed in the slide valve connects a charging passage 45 with a passage 46 that is open to the auxiliary reservoir passage 20 via a brake cylinder application choke 47.

The interlock valve device 15 may comprise, for sake of illustration, a generally cylindrical shuttle valve-like valve member 48 having sealing, slidably guided engagement with the wall of a bore 49 in the casing. The valve member 48 is subject at one end to pressure of fluid in a pressure chamber 50 that is constantly open to a branch of brake cylinder passage 34 and is recessed at the opposite side to accommodate a helical regulating spring 51 disposed in an atmospheric chamber 52.

When the chamber 50 is devoid of fluid under pressure, the valve member 48 is biased by spring 51 to a normal position, in which it is shown in the drawing, and in which an elongated annular cavity 53 formed in said valve member connects a branch of the passage 28 with a branch of the passage 32.

The improved service valve device 16 comprises a pair of coaxially arranged, annular flexible diaphragms 54, 55 both of which are suitably clamped adjacent their respective outer peripheral edges between sections of the casing 3; said diaphragms being cooperably, though not positively, connected so as to form a diaphragm stack, as will be understood from subsequent description. At one side of the diaphragm 54 is a chamber 56 that is constantly open to the control reservoir 8 via a branch of the passage 43; and at the opposite side of said diaphragm is a chamber 57 that is constantly open to the passage 45 via a baffle choke 58, a passage 59 and an auxiliary reservoir final charging choke 60.

According to the invention, the diaphragm 54 adjacent its inner peripheral edge is suitably clamped, as by screws 61, between an annular disc-like follower member 62 and a follower member 63 that comprises an annular disc-like part which abuts the annular member 62 and also comprises an integrally formed, depending tube-like part that extends through the central opening through said annular member 62 and projects into and in part defines the control chamber 56; said tube-like part being enclosed at its projecting end for preventing leakage of fluid under pressure between the chambers 56, 57. A helical spring 64, disposed in chamber 56 and encircling the tube-like part of follower member 63, bears against an inwardly directed annular flange of a spring retainer 65 that has an outwardly directed flange which is adapted to abuttingly engage an annular guide and stop 66 secured to the casing, so as to thereby limit the extent of expansion of the spring 64 in the direction of the diaphragm 54; said spring being adapted, by contact of the retainer 65 with the follower member 62, to urge the diaphragm 54 in a direction away from the control chamber 56. The diaphragm 54 is urged in the opposite direction by pressure of a helical spring 67 that is accommodated in the tube-like part of follower member 63 in encirclement of a cylindrical, coaxially arranged spring guide 68 and seats against a casing partition 69, with which said guide is preferably integrally formed. The casing partition 69 separates the chamber 57 from a chamber 70 that is at one side of the diaphragm 55 and is constantly open via a service or straight-air pipe 71 to a hose coupling 72, for reasons hereinafter to be explained.

A cylindrical rod 73, having sealing, slidably guided engagement with the wall of a coaxially arranged bore extending through the spring guide 68 is adapted to transmit fluid pressure induced forces between the diaphragms 54, 55 through abutting engagement at its opposite ends, respectively, with the enclosed end of member 63 and with a diaphragm follower assemblage 74 that is suitably secured to the diaphragm 55 about its inner peripheral edge. At the side of diaphragm 55 opposite chamber 70 is a chamber 75 that is constantly open via a baffle choke 76 to a branch of brake cylinder passage 34. Preferably formed integrally with one of the parts of the follower assemblage 74 is a coaxially arranged, cylindrical slide valve 77 that projects through chamber 75 and adjacent its projecting end has sealing, slidably guided engagement with the wall of an aligned bore 78 in the casing. In chamber 75 is a helical bias spring 79 which exerts on the diaphragm follower assemblage 74 a pressure only sufficient to assure that the slide valve 77 will be biased to a release position, in which it is shown in the drawing, when the brake cylinder pipe 11 and hence chamber 75 is vented and the chambers 57, 56 are fully charged, in the manner to be described subsequently.

As with structure heretofore proposed, when the slide valve 77 is in release position, an elongated annular cavity 80 formed therein connects a branch of brake pipe passage 22 to a branch of passage 59. And also in this position, an elongated annular cavity 81, formed by a reduced diameter portion of the slide valve 77 adjacent its projecting end and constantly open to a branch of brake cylinder passage 34, is open by way of a bore-like opening 82 extending coaxially inward from said projecting end and thence via respective annular cavities 83, 84 in said slide valve to parallel arranged passages 85, 86 that lead to atmosphere via brake cylinder release chokes 87, 88, respectively, and a common vent passage 89 in the pipe bracket 2. Also, with the slide valve 77 in release position, its projecting end is spaced apart from a coaxially arranged poppet-type check valve 90 which is urged to a seated position by a helical spring 91 in a chamber 92 for preventing flow of fluid under pressure from the auxiliary reservoir 10 via passage 46 and chamber 92 to either the cavity 81 leading to the brake cylinder pipe 11 or to the bore-like opening 82 (which is then open to atmosphere).

A preferably disc-shaped auxiliary reservoir charging check valve 93 is interposed between branches of the passages 46, 59 for permitting flow from the brake pipe 4 to the auxiliary reservoir 10 whenever fluid pressure in passage 59 exceeds that in auxiliary reservoir passage 46 by a degree, such as about 1.7 p. s. i., sufficient to overcome resistance of a helical bias spring 94 acting on the side of said check valve nearest the auxiliary reservoir; said check valve preventing flow in the reverse direction. Also a preferably disc-shaped check valve 95 is interposed between a branch of passage 45 and a passage 96 for permitting dissipation of overcharge from the auxiliary reservoir 10 into the brake pipe 4 by flow at the rate controlled by a choke 97 interposed between said passage 96 and a branch of brake pipe passage 22; said check valve preventing flow in the reverse direction.

According to another feature of the invention, a pressure reducing valve device 98 is provided which may be of any well-known type such as the type designated as the "NS-1 Reducing Valve" and shown and described in instruction pamphlet No. 5066, dated August 1950, entitled "24-RL Locomotive Brake Equipment" and published by The Westinghouse Air Brake Company. This valve device 98 is interposed between a branch of the brake pipe 4 and a pipe 99 that is adapted to be charged with fluid under pressure from a main reservoir pipe (not shown) on an automotive tractor by way of a hose coupling 100 and a manually operable cock 101; and said valve device operates as a feed valve to provide in the brake pipe 4 fluid at the normal full charge or operating value of brake pipe pressure, of say 70 p. s. i., when the vehicle is drawn by an automotive tractor. Interposed between branches of the pipes 4, 99 in by-pass of the reducing valve device 98 is a check valve 102 which permits release of fluid under pressure from the brake pipe and prevents flow in the reverse direction, for reasons hereinafter to be described.

Operation—Fig. 1

When the brake equipment is devoid of fluid under pressure, the various components of the brake controlling valve device 1 will be in the respective positions in which they are shown in the drawing, as will be understood from previous description.

Operation in rail service

Assuming now that a road-rail vehicle having the improved brake equipment is to be hauled in a railway train, the brake pipe 4 is suitably connected via the usual hose couplings to the brake pipe sections (not shown) on the adjacent forward and rearward cars, and the handles of the cocks 5, 6 are moved to open position for enabling control of brakes on the particular vehicle and all rearward vehicles according to variations in pressure of fluid in the brake pipe at the locomotive, as effected by the operator, in the well-known manner. The handle of cock 101 is turned to closed position for preventing release of fluid under pressure from the brake pipe to atmosphere via the check valve 102 and the disconnected hose coupling 100. The hose coupling 72 is also disconnected and hence the chamber 70 of service valve device 16 is open to atmosphere.

Initial charging

To initially charge the equipment, fluid under pressure is supplied to the brake pipe at the locomotive in the well-known manner. Some of this fluid under pressure will flow via brake pipe 4 and one branch of passage 22 to the chamber 21 of the quick service valve device 13; and some of such fluid will also flow via another branch of passage 22 and at the rate controlled by the control reservoir charging choke 42 to passage 41, whence it will flow via cavity 40 of the charging slide valve and branches of passage 43 to the control reservoir 8 and to chamber 56 of the service valve device 16.

Meanwhile some fluid under pressure will flow via still another branch of brake pipe passage 22 and through cavity 80 of the service slide valve 77 to passage 59, whence it will flow to the chamber 57 of service valve device 16 and also to the under side of the auxiliary reservoir charging check valve 93, unseating said check valve and flowing via branches of passage 46 to the chamber 92 at the spring side of the check valve 90 and also via choke 47 and passage 20 to the auxiliary reservoir 10 and to the chamber 19 of the quick service valve device 13. Meanwhile, some fluid under pressure will also flow via still another branch of passage 59 and at the rate controlled by the auxiliary reservoir final charging choke 60 to passage 45 and thence via port 44 in the charging slide valve 38 to passage 46 and thence via choke 47 to the auxiliary reservoir 10 and chamber 19; it being noted that the auxiliary reservoir will be charged primarily by way of the auxiliary reservoir charging check valve 93, as above described, until auxiliary reservoir pressure is within the illustrated 1.7 p. s. i. of brake pipe pressure, as determined by the value of spring 94, whereupon final charging of the auxiliary reservoir to equality with brake pipe will be solely by way of and at the restricted rate controlled by choke 60.

If the vehicle is near the head of the train, where the pressure head in the brake pipe is the greatest during initial charging, the pressure of fluid in the chamber 57 of the service valve device 16 may tend to exceed the value of control reservoir pressure as noted in chamber 56 by more than a preselected degree, such as .7 p. s. i., as determined by the value of spring 64. If and when this should occur, the diaphragm 54 will be deflected against resistance of spring 64 until the follower member 62 engages the stop 66; and at the same time the diaphragm 55 will be deflected a corresponding amount by pressure of the bias spring 79 for thereby shifting the slide valve 77 to a retarded recharge position, in which the cavity 80 is out of registry with the brake pipe passage 22 and thus interrupts supply of fluid under pressure to the auxiliary reservoir 10 and chamber 57, via communications previously described including check valve 93 and choke 60 until fluid under pressure supplied from brake pipe passage 22 to the control reservoir 8 and hence chamber 56 via the choke 42 has increased sufficiently to shift the diaphragm stack upwardly and thus return the slide valve 77 to release position. This feature provides for more uniform charging of the brake equipment throughout the train.

When the slide valve 77 is in its retarded recharge position the cavity 84 is out of registry with the brake cylinder release passage 86; however, cavity 83 is still open to exhaust passage 85. Hence it will be noted that throughout initial charging, and irrespective of whether the slide valve 77 is in its release or its retarded recharge position, the brake cylinder pipe 11 will be maintained vented to atmosphere by way of communication including passage 34, cavity 81, opening 82, cavity 83 and exhaust passage 85. With brake cylinder passage 34 thus vented, it will be understood that the interlock valve member 48 will be in its normal position, and hence the quick service volume 29 will be vented by way of the said valve member and passage.

It will be noted that the pressure of fluid in the quick service valve chamber 21, which is charged directly from brake pipe passage 22, will increase more rapidly than the opposing pressure in chamber 19; and hence throughout initial charging the quick service slide valve 24 will be maintained in normal position.

It will thus be understood that at the completion of initial charging, the various components of the brake controlling valve device 1 will be in the respective positions in which they are shown in the drawing.

Effecting an application of brakes

To produce an application of brakes, the operator effects a reduction in brake pipe pressure at the locomotive to a selected value (below its normal full charge value) corresponding to the degree of application desired, in the well-known manner.

On a particular vehicle, the consequent reduction in pressure of fluid in the brake pipe 4 and hence in brake pipe passage 22 will be noted in the chamber 21 of the quick service valve device 13, causing diaphragm 17 to be deflected against resistance of spring 26 by preponderant auxiliary reservoir pressure in chamber 19 for thereby shifting slide valve 24 to a quick service position, in which fluid under pressure is locally released from the brake pipe 4 at a substantially unrestricted rate by flow via brake pipe passage 22, chamber 21, cavity 27, and passage 28 into the quick service volume 29 for causing a local quick service reduction in brake pipe pressure; and some of such fluid will also flow via another branch of passage 28 and through the cavity 53 of interlock valve member 48 (then in normal position) and passage 32 to chamber 31 of the charging valve device 14 for deflecting the diaphragm 30 against resistance of spring 35 and thereby shifting slide valve 38 to a cut-off position, in which the cavity 40 and port 44 are disconnected from passages 41, 45, respectively, for preventing back flow of fluid under pressure from the control and auxiliary reservoirs 8, 10 into the brake pipe via the respective charging communications described in connection with initial charging. After the quick service volume 29 is thus charged, fluid under pressure will continue to be released from the brake pipe 4 by flow from passage 32 into the brake cylinder passage 34 at the rate controlled by the continued quick service reduction choke 33.

Meanwhile, when brake pipe pressure, as noted in chamber 57 of the service valve device 16 via slide valve cavity 80 and passage 59, has reduced a chosen degree, such as 3 p. s. i., as determined by the value of spring 67, the diaphragm 54 will be deflected against resistance of said spring by preponderating effect of fluid pressure in the control chamber 56, and, through the medium of the rod 73 and follower assemblage 74, thereby shift the slide valve 77 from release position to an application position. In this position, the slide valve 77 at its projecting end sealingly engages and unseats the check valve 90 against resistance of spring 91 for permitting fluid under pressure to flow from the auxiliary reservoir 10 to the brake cylinders 12 at the rate controlled by the brake cylinder application choke 47, via passage 46, the unseated check valve 90, cavity 81, and brake cylinder passage 34; the opening 82 being sealed off from the brake cylinders and auxiliary reservoir through such sealing engagement of said projecting end against said check valve. This flow from the auxiliary reservoir 10 to the brake cylinders 12 will continue until brake cylinder pressure, as noted by way of passage 34 and baffle choke 76 in chamber 75 of the service valve device 16, has increased to a value proportionate to the operator-effected chosen reduction in brake pipe pressure; whereupon a slight further increase in brake cylinder pressure will cause the diaphragm stack to be deflected downwardly and shift the slide valve 77 to a lap position, in which the check valve 90 is seated for cutting off the brake cylinders 12 from the auxiliary reservoir 10 and the projecting end of the slide valve maintains sealing contact with said check valve for sealing off the exhaust opening 82 from said brake cylinders and reservoir. Thus, with the slide valve 77 in lap position, fluid will be bottled up in the brake cylinders 12 at a pressure corresponding to the chosen degree of reduction in brake pipe pressure.

Meanwhile, when brake cylinder pressure and hence pressure in chamber 50 of interlock valve device 15 had increased sufficiently to overcome resistance of the spring 51, the valve member 48 will have been shifted from normal position to a cut-off position, in which cavity 53 disconnects the quick service volume 29 from the passage 32, for terminating the above-described continued quick service reduction in brake pipe pressure; whereupon brake cylinder pressure bleeding back through the choke 33 will maintain the chamber 31 charged for maintaining the charging slide valve 38 in its cut-off position.

It will thus be noted that the interlock valve device 15 operates to assure that whenever brake pipe pressure on the particular vehicle is reduced at least a chosen degree, such as .7 p. s. i., below its normal full charge value and thus causes the quick service slide valve 24 to be shifted to quick service position, fluid under pressure will be locally released from the brake pipe 4 until brake cylinder pressure has increased (by operation of the service valve device 16) to a selected value, such as about 9 p. s. i., as determined by the effect of spring 51, which value corresponds to that for a desired degree of minimum application of brakes.

Effecting a release of brakes

In order to effect a release of brakes, the operator supplies fluid under pressure to the brake pipe at the locomotive, in the well-known manner. The consequent increase in brake pipe pressure, as noted in the brake pipe passage 22 and hence in the chamber 57 of the service valve device 16 on a particular vehicle, causes the diaphragm 54 to deflect downwardly and hence permit spring 79 to deflect diaphragm 55 a corresponding extent with the result that the slide valve 77 will be shifted to release position or else, if the vehicle is near the front of the train, where the pressure head in the brake pipe is large, to retarded recharge position, as discussed in connection with initial charging.

If and when the slide valve 77 is in retarded recharge position, recharging of the auxiliary reservoir 10 will be suspended because the service slide valve cavity 80 will cut off flow from the brake pipe passage 22 to the passage 59 and charging check valve 93; and fluid under pressure will be released from the brake cylinders 12 via cavity 81 and opening 82 at the restricted rate controlled by the single brake cylinder release choke 87, until brake cylinder pressure in chamber 75 has reduced sufficiently to cause the diaphragm stack to be shifted upwardly by the preponderating effect of control reservoir pressure in chamber 56 and thus move the slide valve 77 to release position. At the rear of the train, however, where the rate of brake pipe rise is slower, the service slide valve 77 will generally initially move to and remain in release position when brake pipe pressure is increased for releasing brakes.

With the slide valve 77 in release position, fluid under pressure will be released from the brake cylinders 12 and from the chamber 75 via the cavity 81 and opening 82 at a rate corresponding to the combined flow capacities of the brake cylinder release chokes 87, 88; and also pressure of fluid in the auxiliary reservoir 10 will rise at substantially the same rate as, but be about 1.7 p. s. i. less than brake pipe pressure by flow of fluid under pressure from the brake pipe passage 22 via the cavity 80, passage 59 and check valve 93, as will be understood from previous description. In the case of a graduated or partial release of brakes, the slide valve 77 will be reshifted to lap position when brake cylinder pressure has been reduced a degree proportionate to the degree of increase in brake pipe pressure. If the brake pipe is recharged to its normal full charge value for effecting a complete release of brakes, however, the slide valve 77 will remain in release position and completely vent the brake cylinders 12.

Meanwhile, when brake cylinder pressure in chamber 50 reduces below the illustrative 9 p. s. i., the spring 51 will shift the interlock valve member 48 to normal position for causing fluid under pressure hitherto bottled up in the quick service volume 29 to be released via cavity 53 and the brake cylinder passage 34; it being noted that at some time prior to this shifting of valve member 48, the combined effect of increasing brake pipe pressure and the pressure of the spring 26 in chamber 21 of quick service valve device 13 will have been sufficient to overcome the opposing effect on the diaphragm 17 of auxiliary reservoir pressure in chamber 19 and thus cause the slide valve 24 to be shifted to normal position for cutting off the brake pipe from the quick service volume 29, for it will be recalled that the auxiliary reservoir cannot be recharged via the check valve 93 to a value higher than 1.7 p. s. i. below brake pipe pressure.

When pressure in the chamber 31 of device 14 has blown down to substantially atmospheric pressure via the choke 33 and the vented brake cylinder passage 34, the slide valve 38 will be shifted to charging position by pressure of spring 35, thereby permitting equalization of brake pipe pressure with control reservoir pressure via cavity 40 and choke 42 and also restoring auxiliary reservoir pressure to equality with brake pipe pressure by flow via passage 59, choke 60, passage 45 and port 44 to passage 46.

When the brakes are completely released, the various components of the brake controlling valve device 1 will once again be in the respective positions in which they are shown in the drawing.

Operation in road or highway service

Assuming now that the vehicle is coupled to an automotive type tractor and is to be hauled on the highways, the handles of the angle cocks 5, 6 at the ends of the brake pipe 4 are moved to closed position; the hose coupling 100 is suitably connected to the main reservoir (not shown) on said tractor, and the handle of cock 101 is moved to an open position so that the reducing valve device 98 will operate to provide in the brake pipe 4 fluid at a pressure corresponding to the normal full charge value of brake pipe pressure as during railway service; and the hose coupling 72 is suitably connected to the straight-air hose (not shown) on the tractor, the pressure in which latter hose controls the degree of application of brakes.

To initially charge the equipment, the aforementioned main reservoir on the tractor is charged in the usual manner, thereby supplying fluid under pressure via the pipe 99 to the reducing valve device 98 which, as just stated, provides fluid in the brake pipe 4 at the normal full charge value of brake pipe pressure. Fluid under pressure thus supplied to the brake pipe 4 flows via communications previously described for initially charging the equipment in exactly the same manner as already described in connection with railway service.

To effect an application of brakes, the operator operates, on the tractor, the usual tractor pneumatic brake apparatus for applying tractor brakes pneumatically and at the same time supplying fluid under pressure to the chamber 70 of the service valve device 16 via the coupling 72 and service pipe 71. Fluid under pressure thus supplied to chamber 70 deflects the diaphragm 55 upwardly for shifting the slide valve 77 to application position for applying brakes in the manner, and by way of communications, described in connection with railway service; said slide valve being shifted to lap position for bottling up fluid under pressure in the brake cylinders 12 when brake cylinder pressure, as noted in chamber 75, has increased to a value substantially equal to service pipe pressure in chamber 70. And when service pipe pressure is reduced for releasing brakes, the diaphragm 55 will deflect downwardly for shifting the slide valve 77 to release position for releasing brakes, as previously described; it being noted that if the rate of release of fluid under pressure from the pipe 71 is sufficiently rapid relative to the rate at which fluid under pressure is released from the brake cylinders 12 (as controlled by the combined flow capacities of release chokes 87, 88), the slide valve 77 may be shifted to retarded recharge position, for thereby restricting the rate of release of fluid under pressure from said brake cylinders to that controlled by the flow capacity of choke 87. If preferred, however, the retarded recharge and release feature may be entirely eliminated, such that the slide valve 77 will be initially shifted to and remain in its previously defined release position during a release of brakes when operating in either rail or road service; this modification being accomplished merely by inserting a plug in place of the choke 88 and correspondingly increasing the flow capacity of choke 87 and also eliminating the spring 64, the spring retainer 65 and stop 66 and replacing said stop with another stop which will be engaged by the follower member 62 when the slide valve 77 is in its release position.

According to a feature of the invention, if during road operation, the pressure of fluid in the pipe 99 should drop below that in the brake pipe 4, due for example to a loss of supply pressure from the tractor or a separation of the vehicle from the tractor, fluid under pressure will be released from the brake pipe by way of the check valve 102 and cause operation of the equipment for applying brakes, as will be understood from previous description relative to railway operation.

According to another feature of the invention, the weight of spring 79 is only sufficient to bias the slide valve 77 to release position when the equipment is devoid of fluid under pressure. The spring 67, on the other hand, is of such weight as to assure that brakes will be released when brake pipe pressure is restored to within about 3 p. s. i. of normal full charge value (i. e., pressure of fluid in control chamber 56) during release of a brake application; said spring therefore being of such weight as to exert a force on the diaphragm 54 equivalent to 3 p. s. i. of brake pipe pressure acting over the effective area of said diaphragm. In view of this arrangement, the equipment operates in the same manner as railway brake equipments heretofore proposed to release brakes before brake pipe pressure is fully restored; yet the improved equipment, by providing the bias spring 79 in chamber 75 and the stronger spring 67 in chamber 57, assures that during control of brakes on the straight-air principle, brake cylinder pressure will be substantially equal to the pressure in service pipe 71 instead of being about 3 p. s. i. less than service pipe pressure.

It will also be noted that during operation on the automatic brake pipe reduction principle, the two service valve diaphragms 54, 55 and their associated structure cooperate to form a diaphragm stack; whereas during operation on the straight-air principle, the diaphragm 55 operates as a simple relay, while the other diaphragm 54 normally remains static, so long as brake pipe pressure is maintained at the value of control reservoir pressure in chamber 56.

*Description and operation—Fig. 2*

According to this modified embodiment of the invention, in rail service, brakes on the vehicle may be controlled on either the automatic brake pipe pressure reduction principle or the straight-air principle; whereas in road service the vehicle brakes are controlled exclusively on the straight-air principle in the manner just described.

Referring to Fig. 2 of the drawing, the improved vehicle brake equipment is adapted to be controlled by electro-pneumatic locomotive brake equipment, such as of the 24–RL type shown and described in the aforementioned instruction pamphlet and comprising an application train wire 103, a release train wire 104, and a return wire 105, each of which wires extend from the locomotive throughout the train; said equipment comprising means (not shown herein but fully described in said pamphlet) under control of the operator at the locomotive and operative to energize said application and release wires for causing an application of brakes, deenergize said application and release wires for causing a release of brakes and deenergize the application wire while maintaining the release wire energized for causing fluid to be bottled up in the brake cylinder at the desired pressure.

On the road-rail vehicle a magnet valve device 106 is provided, which may be of any suitable type such as the "No. 21–B Magnet Valve" fully described in the aforementioned instruction pamphlet. This magnet valve device is responsive to deenergization of the application and release train wires, 103, 104 to open a branch of the straight-air pipe 71 to atmosphere via a vent (not shown) for releasing brakes, and responsive to concurrent energization of said wires 103, 104 to cut off said pipe 71 from said vent and open said pipe to a branch of the auxiliary reservoir pipe 9 for supplying fluid under pressure from the auxiliary reservoir 10 to the chamber 70, and responsive to deenergization of wire 103 (while wire 104 remains energized) for bottling up pressure in the pipe 71 at the desired pressure; the service valve diaphragm 55 being operative to so control positioning of the slide valve 77 as to provide in the chamber 75 and hence in the brake cylinders 12 fluid at a pressure substantially identical with the pressure obtained in the chamber 70 as controlled by operation of said magnet valve device, as will be understood from previous discussion in connection with Fig. 1 of operation in road service.

Since the magnet valve device 106 is operative to vent the straight-air pipe 71 and hence the chamber 70 when the application and release train wires 103, 104 are deenergized, it will be seen that the improved equipment will respond to variations in brake pipe pressure for controlling brakes in the same manner as explained in connection with the embodiment of Fig. 1 during rail service.

As previously explained in connection with the embodiment of Fig. 1, the cock 101 is closed during rail service for preventing release of fluid under pressure from the brake pipe to atmosphere via check valve 102 and the disconnected hose coupling.

It will, of course, be understood that the combined automatic and electropneumatic brake equipment shown in Fig. 2 of the drawing may be used on a conventional railway car with the hose coupling 72 and branch of the pipe 71 leading thereto and hose coupling 100, cock 101, valves 98 and 102, and pipe 99 eliminated, if desired; said equipment being adapted for use with locomotive brake equipment of the 24–RL type above discussed.

*Summary*

It will now be seen that the improved brake equipment embodies a relatively inexpensive, compact unitary brake controlling valve device which is adapted to respond to variations in brake pipe pressure relative to a datum pressure in a control reservoir (which pressure is equal to the normal full charge value of brake pipe pressure) for controlling brakes on a road-rail vehicle on the automatic principle when said vehicle is employed in rail service; said valve device also being adapted to respond to variations in pressure in a service or straight-air pipe associated with either an automotive tractor or a railway train for controlling brakes on the straight-air principle in road or rail service.

Having now described the invention, what we claim as new and desire to secure by Letters Patent, is:

1. A combined automatic and straight-air fluid pressure brake equipment for a road-rail vehicle adapted to be hauled by a railway locomotive or an automotive tractor, said equipment comprising a brake pipe, a service pipe, service valve means responsive to a chosen reduction in brake pipe pressure below a normal full charge value for causing an automatic application of vehicle brakes to a degree proportionate to said chosen reduction and responsive to a subsequent increase in brake pipe pressure for correspondingly releasing brakes, said service valve means also being responsive to charging of said service pipe with fluid under pressure for causing a straight-air application of vehicle brakes to a degree corresponding to pressure of fluid in said service pipe and responsive to a subsequent decrease in service pipe pressure for correspondingly releasing brakes, said service pipe being open to atmosphere during rail service and the pressure in such pipe being controlled from the tractor during road service, a charging pipe charged with fluid under pressure from the tractor during road service and closed off from atmosphere when the vehicle is disconnected from the tractor during rail service, and reducing valve means interposed between said charging pipe and a branch of said brake pipe for providing in said brake pipe fluid at the normal full charge value of brake pipe pressure during road service, the pressure of fluid in said brake pipe being controlled from the locomotive during rail service and said brake pipe at its respective ends being closed off from atmosphere when the vehicle is disconnected from a train during road service.

2. The combination according to claim 1, including valve means for permitting release of fluid under pressure from the brake pipe into the charging pipe in by-pass of said reducing valve means and preventing such by-passing flow in the reverse direction, whereby an automatic application of vehicle brakes will occur if during road service pressure of fluid in the charging pipe reduces below the normal operating value of brake pipe pressure.

3. A combined automatic and straight-air fluid pressure brake equipment comprising a brake pipe, a brake cylinder, a straight-air pipe, and a service valve device comprising two coaxially arranged movable abutments and valve means arranged coaxially with and controlled by said movable abutments, one of said movable abutment being subject opposingly to pressures of fluid in said brake cylinder and straight-air pipe and the other movable abutment being subject to brake pipe pressure and to a constant opposing pressure corresponding to a normal full charge value of brake pipe pressure, said movable abutments being cooperable as a stack in response to any chosen degree of reduction in brake pipe pressure below said constant pressure while the straight-air pipe is vented to cause operation of said valve means to provide in said brake cylinder fluid at a pressure corresponding to said chosen reduction and said stack being responsive to a subsequent increase in brake pipe pressure while the straight air pipe is vented to cause said valve means to operate to release fluid under pressure from the brake cylinder to a degree corresponding to the extent of such subsequent increase in brake pipe pressure, and said one movable abutment being operable independently of the other movable abutment responsive to charging of said straight-air pipe while said brake pipe is maintained charged to its normal full charge value to cause operation of said valve means to provide in said brake cylinder fluid at a pressure corresponding substantially to pressure of fluid in said straight-air pipe.

4. A combined automatic and straight-air fluid pressure brake equipment comprising a brake pipe, a brake cylinder, a straight-air pipe, and a service valve device comprising two coaxially arranged movable abutments and valve means operably connected to one of said movable abutments at the side thereof opposite the other of said movable abutments, said one movable abutment being subject opposingly to pressures of fluid in said brake cylinder and straight-air pipe and the other movable abutment being subject to brake pipe pressure and to a constant opposing pressure corresponding to a normal full charge value of brake pipe pressure, said movable abutments being cooperable as a stack in response to a chosen reduction in brake pipe pressure below said constant pressure while the straight-air pipe is vented to cause operation of said valve means to provide in said brake cylinder fluid at a pressure corresponding to said chosen reduction and said stack being responsive to a subsequent increase in brake pipe pressure while the straight air pipe is vented to cause said valve means to operate to release fluid under pressure from the brake cylinder to a degree corresponding to the extent of such subsequent increase in brake pipe pressure, and said one movable abutment being operative independently of the other movable abutment responsive to charging of said straight-air pipe while said brake pipe is maintained charged to its normal full charge value to cause operation of said valve means to provide in said brake cylinder fluid at a pressure corresponding substantially to pressure of fluid in said straight-air pipe, relatively light bias means for urging said valve means in one direction to a position for venting said brake cylinder, and heavier bias means urging the other movable abutment in said one direction for assuring that following an automatic application of brakes responsively to a reduction in brake pipe pressure said valve means will operate to completely vent said brake cylinder when brake pipe pressure has been restored to a value somewhat below its normal full charge value.

5. A combined automatic and straight-air fluid pressure brake equipment comprising, in combination, a brake pipe normally charged with fluid under pressure; a straight-air pipe normally vented and chargeable with fluid at a pressure corresponding to the degree of straight-air brake application desired; a control reservoir charged with fluid at the normal charge value of brake pipe pressure; an auxiliary reservoir; a brake cylinder; and a self-lapping service valve device comprising valve means for controlling pressure of fluid in the brake cylinder, a plurality of movable abutments arranged in a stack coaxially with said valve means for controlling operation of said valve means, and bias means, said stack being subject to control reservoir pressure and straight-air pipe pressure opposing brake pipe pressure and brake cylinder pressure and pressure of said bias means, said bias means operatively urging said valve means to a position for venting said brake cylinder, said stack being responsive to a reduction in brake pipe pressure below control reservoir pressure while said straight-air pipe is vented to cause said valve means to supply fluid under pressure from the auxiliary reservoir to the brake cylinder for providing in the latter fluid at a pressure corresponding substantially to the extent of such brake pipe pressure reduction, said stack being responsive to a subsequent increase in brake pipe pressure to cause said valve means to release fluid under pressure from said brake cylinder to a degree corresponding substantially to the extent of such brake pipe pressure increase, one of said movable abutments being operable independently of the remainder of the stack responsively to an increase in pressure in said straight-air pipe while the brake pipe is charged to normal charge value to cause said valve means to provide in said brake cylinder fluid at a pressure substantially equal to the pressure in the straight-air pipe and operable responsively to a reduction in pressure in said straight-air pipe while the brake pipe is charged to normal charge value to release fluid under pressure from said brake cylinder to a degree substantially equal to the extent of such reduction in straight-air pipe pressure.

6. The combination according to claim 5, further characterized in that said service valve device comprises two movable abutments of different effective areas, said one movable abutment being of smaller effective area than that of the other of said movable abutments, such that each increment of variation of brake pipe pressure will cause said valve means to effect a chosen greater increment of variation of brake cylinder pressure.

References Cited in the file of this patent

UNITED STATES PATENTS

| | | |
|---|---|---|
| 1,693,943 | Thomas | Dec. 4, 1928 |
| 2,135,007 | Kamenarovic | Nov. 1, 1938 |
| 2,152,257 | Hewitt et al. | Mar. 28, 1939 |
| 2,234,897 | Eaton | Mar. 11, 1941 |
| 2,289,559 | Turek | July 14, 1942 |
| 2,380,507 | Eaton | July 31, 1945 |